Patented Jan. 20, 1925.

1,523,519

UNITED STATES PATENT OFFICE.

WILLIS A. GIBBONS, OF LITTLE NECK, NEW YORK, ASSIGNOR TO THE HARTFORD RUBBER WORKS COMPANY, OF HARTFORD, CONNECTICUT, A CORPORATION OF CONNECTICUT.

CORE OR FILLER OF FUSIBLE MATERIAL FOR HOLLOW VULCANIZABLE ARTICLES.

No Drawing. Application filed February 12, 1924. Serial No. 692,434.

*To all whom it may concern:*

Be it known that I, WILLIS A. GIBBONS, a citizen of the United States, residing at Little Neck, county of Queens, and State of New York, have invented a certain new and useful Core or Filler of Fusible Material for Hollow Vulcanizable Articles, of which the following is a full, clear, and exact description.

This invention relates to a core or filler of fusible material for hollow vulcanizable articles, more particularly for use with vulcanizable articles which are to be given a heat cure.

In the manufacture of hollow articles of vulcanizable material it is usually necessary at some or all stages of the process to provide an internal support in the form of a filler or core. This support may be used in the building up of the article, in the curing operation, or for both purposes. For instance in the case of cushion tires the article is ordinarily both build up and cured on a solid core. In some methods of making pneumatic tires this also applies, while in other cases a core may or may not be used in building up the tire, but the final curing operation is carried on while the tire is inflated either by the use of a bag or by direct inflation with a fluid filler. Both in the case of tires and other articles it is frequently a laborious and time consuming operation to remove solid cores from the finished vulcanized articles, as such cores are ordinarily made of metal. They are also heavy, expensive to make, and owing to the large assortment necessary for different sizes require valuable storage space. Various sectional cores have been devised to render this operation less difficult, but such cores are heavy, expensive and otherwise unsuitable. In the case of present day cushion tires such as truck tires which are vulcanized directly on the rim on which they are to be used, an attempt has been made to obviate the difficulty of removing the core by making it in sections and withdrawing the sections through openings in the rim; or alternatively, by forming the rim in two circumferentially split sections and after the curing operation prying these sections apart in order to remove the core, the sections being then welded or otherwise joined together. These methods are expensive, and obviously reduce the strength of the rim. It has been proposed to use a fusible core made of low melting point alloys, but such alloys are expensive, heavy, they are acted upon by the sulphur and also oxidized thereby requiring purification, and as they are comparatively tough they can only be removed from the finished article in a molten condition or by forming them in sections which are open to the same objections as the usual sectional cores.

An object of my invention is to provide an improved fusible filler or core for use in vulcanizable articles during the curing and other operations.

Another object is to provide a fusible filler or core which can be used repeatedly without deterioration or purification.

Still another object is to provide a fusible filler or core which is cheap, light in weight, and non-volatile and non-decomposable at the ordinary vulcanizing temperatures.

A further object is to provide a fusible filler or core, the melting point of which may be easily varied in accordance with its manner of use and the vulcanizing temperature desired.

A still further object is to provide a fusible filler or core which may be used in either a molten or a solid state and readily removed in either state.

The invention consists broadly in the provision of a filler or core of fusible material formed by a fused mixture of low melting point non-volatile salts.

For a detailed disclosure of the nature and objects of the invention reference is had to the accompanying specification.

In carrying out the invention a fusible mixture is first formed by melting together relatively low melting point salts which are non-volatile and non-decomposable at or somewhat above the usual vulcanizing temperatures. The usual temperatures used in vulcanizing by heat are from about 138° C. to 150° C., that is, 280.4° to 302° F., although these temperatures may of course be varied under certain conditions such as when using the so-called cold curing accelerators. The salts, potassium nitrate, potassium nitrite, sodium nitrate and sodium nitrite, respectively, have the following melting points, 337° C., 297.5° C., 316° C., and 213° C. We have found that by the use of various combinations of these salts and in different proportions a mixture can be obtained with a melting point making it suitable for use as a fusible filler or core for vulcanizable articles.

As an example of suitable mixtures obtained by the use of potassium nitrate and sodium nitrite the following table is given:

| Molecular % | | Weight % | | Freezing point | |
|---|---|---|---|---|---|
| $KNO_3$ | $NaNO_2$ | $KNO_3$ | $NaNO_2$ | °C. | °F. |
| 44.5 | 55.5 | 54.2 | 45.8 | 138 | 280.4 |
| 43.5 | 56.5 | 53. | 47. | 141 | 285.8 |
| 45.5 | 54.5 | 55. | 45. | 143 | 289.4 |
| 42.5 | 57.5 | 51.9 | 48.1 | 145 | 293. |
| 41. | 59. | 50.4 | 49.6 | 148 | 298.4 |
| 40. | 60. | 49.4 | 50.6 | 153 | 307.4 |
| 30. | 70. | 38.7 | 61.3 | 173 | 343.4 |

However, various other combinations of the four salts can be used, and as an illustration of the widely varying melting points which can be obtained with different mixtures of two or more of the salts the following table is given of a few selections from an extended series of tests:

| Molecular % | | | | Molecular % | | | | Freezing point |
|---|---|---|---|---|---|---|---|---|
| $KNO_3$ | $NaNO_3$ | $NaNO_2$ | $KNO_2$ | K | Na | $NO_3$ | $NO_2$ | °C. |
| 30 | | 70 | | 30 | 70 | 30 | 70 | 173 |
| 44.5 | | 55.5 | | 44.5 | 55.5 | 44.5 | 55.5 | 138 |
| 70 | | 30 | | 70 | 30 | 70 | 30 | 212 |
| 90 | | | 10 | 100 | | 90 | 10 | 319 |
| 70 | | | 30 | 100 | | 70 | 30 | 309 |
| 55 | | | 45 | 100 | | 55 | 45 | 319 |
| | | 30 | 70 | 70 | 30 | | 100 | 335 |
| | | 70 | 30 | 30 | 70 | | 100 | 217 |
| | | 80 | 20 | 20 | 80 | | 100 | 245 |
| | 80 | | 20 | 20 | 80 | 80 | 20 | 233 |
| | 55 | | 45 | 45 | 55 | 55 | 45 | 158 |
| | 30 | | 70 | 70 | 30 | 30 | 70 | 265 |
| 20 | 40 | 40 | | 20 | 80 | 60 | 40 | 200 |
| 40 | 5 | 55 | | 40 | 60 | 45 | 55 | 147 |
| 20 | 10 | 70 | | 20 | 80 | 30 | 70 | 195 |
| 43.5 | | 54 | 2.5 | 46 | 54 | 43.5 | 56.5 | 140 |
| 40 | | 50 | 10 | 50 | 50 | 40 | 60 | 144 |
| 70 | | 20 | 10 | 80 | 20 | 70 | 30 | 238 |

It will be noted that the lowest melting point or eutectic of the entire four component system corresponds to a mixture of 55½% sodium nitrite and 44½% potassium nitrate. It has also been found that the eutectic mixture melts practically as a simple compound, that is, its melting point is substantially fixed, while in the case of the other mixtures the melting point varies to some extent. In order to cheapen the mixture a suitable inert filler, such as mineral flour, may be added, and the melting point of any of the mixtures can be lowered in varying degree by the addition of more or less water. If the material is to be used for the direct inflation of a pneumatic tire during the final curing operation a mixture of suitable melting point is prepared and pumped into the tire while in a melted condition at a temperature slightly above that used for the vulcanization. After the cure is completed the filler may be removed, either in its melted condition, or the tire may be allowed to cool until the filler has solidified and the latter then broken out.

The following is an example of a mixture suitable for use as a filler in the curing of a pneumatic tire:

| | Grams. |
|---|---|
| Water | 50 |
| Mineral flour | 100 |
| Potassium nitrate | 170 |
| Sodium nitrite | 90 |
| Total | 410 |

Due to the addition of water this mixture melts at about 200° F. The purpose of the mineral flour is not only to cheapen the mixture but it also renders the solidified mixture weaker and more brittle, so that in case where the filler or core is to be removed while in solid form it may be more readily broken up. The mineral flour has a further function in that it increases the viscosity of the mixture and thereby causes the filler when in the article to heat up more uniformly, so as to prevent local premature or overcuring of the article. In the case of an article such as a cushion tire, which is built up on a rigid core and then cured thereon, a mixture of salts is selected which is solid at the vulcanizing temperature used but has a melting point slightly above that temperature. The mixture is then melted and cast to form the desired core and the tire built up on the core and vulcanized. During the vulcanizing process the core remains solid so as to properly support the tire, but during the last few minutes of the cure the temperature is gradually raised to the melting point of the core, by reason of which the melted core material may then be readily withdrawn. The invention is of course applicable in the manufacture of many other vulcanizable articles than tires, such as battery boxes and other hard rubber articles, hose, etc.

It will be seen that by my invention a fusible filler or core material is obtained which is cheap, does not decompose or volatilize near the usual vulcanizing temperatures, does not give off objectionable fumes, does not oxidize or in other manner form impurities which must be removed, and is relatively light in weight and brittle. By reason of these properties it may be used to form a fluid filler when desirable in the vulcanizing of hollow articles, and this fluid filler may be removed at the finish either in fluid or solid form. On the other hand it may also be used as a core in pre-cast solid form, and this core removed after vulcanization, either in solid form by breaking it up, or by slightly elevating its temperature and withdrawing it in fluid form.

While specific embodiments of the invention have been given, it is obvious that it may be widely varied both in the materials and proportions used and their application, and it is not desired to limit the same otherwise than as set forth in the appended claims.

Having thus described my invention, what I claim and desire to protect by Letters Patent is:—

1. A fusible core or filler for hollow vulcanizable articles formed of fused material containing alkali metal ions and acid radicals.

2. A fusible core or filler for hollow vulcanizable articles formed of fused material containing alkali metal and nitrogen-acid ions.

3. A fusible core or filler for hollow vulcanizable articles formed of a fused mixture of low melting point salts which do not volatilize or decompose at ordinary vulcanizing temperatures.

4. A fusible core or filler for hollow vulcanizable articles formed of a fused mixture of alkali salts of nitric and nitrous acids.

5. A fusible core or filler for hollow vulcanizable articles formed of a fused mixture of compounds of potassium and sodium with nitrogen-acid radicals.

6. A fusible core or filler for hollow vulcanizable articles formed of a fused mixture embodying more than two of the ions K, Na, $NO_3$, and $NO_2$.

7. A fusible core or filler for hollow vulcanizable articles formed of a fused mixture containing the ions of K, Na, $NO_3$, and $NO_2$.

8. A fusible core or filler for hollow vulcanizable articles containing a fused mixture of low melting point salts, non-volatile at ordinary vulcanizing temperatures, and an inert filling material.

9. A fusible core or filler for hollow vulcanizable articles containing alkali metal and nitrogen-acid ions, and an inert filling material.

10. A fusible core or filler for hollow vulcanizable articles formed of a fused mixture containing the ions of K, Na, $NO_3$ and $NO_2$, and an inert filling material.

11. A fusible core or filler for hollow vulcanizable articles formed of a fused mixture containing low melting point salts non-volatile at ordinary vulcanizing temperatures, water and an inert filling material.

12. A fusible core or filler for hollow vulcanizable articles formed of a fused mixture which is brittle when solid and has a melting point not substantially above the usual temperatures used for heat vulcanization.

Signed at New York, county of New York, and State of New York, this 9th day of February, 1924.

WILLIS A. GIBBONS.